(12) United States Patent
Liao et al.

(10) Patent No.: US 10,816,156 B2
(45) Date of Patent: Oct. 27, 2020

(54) LIGHT GUIDING ELEMENT, LIGHT GUIDING DEVICE, AND LIGHTING MODULE

(71) Applicant: Everlight Electronics Co., Ltd., New Taipei (TW)

(72) Inventors: Yi-Hui Liao, New Taipei (TW); Chung-Wei Wang, New Taipei (TW)

(73) Assignee: Everlight Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/482,684

(22) PCT Filed: Feb. 13, 2018

(86) PCT No.: PCT/CN2018/076737
§ 371 (c)(1),
(2) Date: Jul. 31, 2019

(87) PCT Pub. No.: WO2018/149407
PCT Pub. Date: Aug. 23, 2018

(65) Prior Publication Data
US 2020/0003381 A1    Jan. 2, 2020

Related U.S. Application Data

(60) Provisional application No. 62/556,866, filed on Sep. 11, 2017, provisional application No. 62/535,246, (Continued)

(51) Int. Cl.
*F21S 41/143* (2018.01)
*F21S 41/24* (2018.01)
(Continued)

(52) U.S. Cl.
CPC ......... *F21S 41/143* (2018.01); *B60Q 1/0011* (2013.01); *F21S 41/24* (2018.01);
(Continued)

(58) Field of Classification Search
CPC ........ F21S 41/143; F21S 41/24; B60Q 1/0011
See application file for complete search history.

(56) References Cited

U.S. PATENT DOCUMENTS 7,677,777 B2 *  3/2010  Woodward ............ F21S 41/663
                                                        362/511
7,815,351 B2 * 10/2010  Saxena ............... G02B 19/0028
                                                        362/511
(Continued)

FOREIGN PATENT DOCUMENTS

CN       102865540 A      1/2013
CN       104534379 A      4/2015
(Continued)

OTHER PUBLICATIONS

International Search Report in the parent PCT application No. PCT/CN2018/076737, dated May 22, 2018.
(Continued)

*Primary Examiner* — Zheng Song
(74) *Attorney, Agent, or Firm* — Chen Yoshimura LLP

(57) ABSTRACT

Provided are a light guiding element (100), a light guiding device (500), and a lighting module (800). The light guiding element (100) includes a light incident portion (1) and a light exit portion (2), where the light incident portion (1) includes a plurality of light guiding columns (11), each of which includes a first end surface (A) connected to the light exit portion (2), a second end surface (B) facing away from the light exit portion, and a side surface formed between the first end surface (A) and the second end surface (B), where the first end surface (A) has an area larger than that of the second end surface (B). Also provided are a light guiding device (500) including the light guiding element (100), and a lighting module (800) including the light guiding device (500). The light guiding element (100) enables, for a gen-
(Continued)

erated light type pattern, the shape to be complete, the color to be even, and the phenomena of vignette effect and dark lines to be reduced.

15 Claims, 14 Drawing Sheets

Related U.S. Application Data filed on Jul. 21, 2017, provisional application No. 62/458,582, filed on Feb. 14, 2017.

(51) Int. Cl.
*F21S 43/241* (2018.01)
*B60Q 1/00* (2006.01)
*F21Y 115/10* (2016.01)
*F21W 102/13* (2018.01)

(52) U.S. Cl.
CPC ........ *F21S 43/241* (2018.01); *F21W 2102/13* (2018.01); *F21Y 2115/10* (2016.08)

(56) References Cited

U.S. PATENT DOCUMENTS

| | | | |
|---|---|---|---|
| 2013/0010486 A1 | 1/2013 | Natsume et al. | |
| 2013/0250598 A1* | 9/2013 | Lambert | B60Q 1/20 |
| | | | 362/520 |
| 2015/0049503 A1 | 2/2015 | Paroni et al. | |
| 2015/0085523 A1* | 3/2015 | Gurtl | F21S 41/143 |
| | | | 362/607 |
| 2015/0226395 A1* | 8/2015 | Taudt | F21S 41/24 |
| | | | 362/511 |
| 2016/0146419 A1* | 5/2016 | Reinprecht | F21S 41/16 |
| | | | 362/512 |
| 2016/0265732 A1* | 9/2016 | Jacquemin | F21S 41/29 |
| 2017/0089536 A1* | 3/2017 | Courcier | F21S 41/143 |
| 2018/0128443 A1* | 5/2018 | Taudt | F21S 41/141 |
| 2018/0264994 A1* | 9/2018 | Stoehr | B60Q 1/0408 |
| 2018/0306959 A1* | 10/2018 | Schwaiger | F21S 41/24 |
| 2018/0370419 A1* | 12/2018 | Danner | F21S 41/24 |
| 2019/0299853 A1* | 10/2019 | Fleurence | B60Q 3/74 |

FOREIGN PATENT DOCUMENTS

| | | |
|---|---|---|
| CN | 104620044 A | 5/2015 |
| DE | 102015107067 A1 | 11/2016 |
| EP | 2742280 A1 | 6/2014 |
| EP | 2786064 A1 | 10/2014 |
| JP | 2016213014 A | 12/2016 |
| KR | 20150072064 A | 6/2015 |

OTHER PUBLICATIONS

Written Opinion in the parent PCT application No. PCT/CN2018/076737, dated May 22, 2018.

* cited by examiner

LIGHT GUIDING ELEMENT, LIGHT GUIDING DEVICE, AND LIGHTING MODULE

TECHNICAL FIELD

The present disclosure relates to the field of vehicle lighting and, in particular, to a light guiding element, a light guiding device and a lighting module.

BACKGROUND

Recently, a light-emitting diode (LED) matrix-type lamp module for a vehicle has been proposed. Unlike a conventional vehicle lamp, this LED matrix-type lamp module has a plurality of LED light sources, each of which may be independently controlled by a control circuit to generate a lighting area. Under the control of the control circuit, the lighting area of each LED light source may be controlled to be lightened or not to be lightened, and thus a desired light type pattern can be generated.

However, due to the light guiding design of the existing LED matrix-type lamp module, the light type pattern generated thereby has various problems, including phenomena such as a vignette effect of the light type pattern, color unevenness (yellow halo), dark lines and the like, which may jeopardize safety of drivers and pedestrians. In addition, low beam lights that must always be lightened during night driving need to maintain a certain level of illumination intensity, and meanwhile they should not interfere with drivers and pedestrians in an opposite direction. An existing LED matrix-type low beam light module cannot adequately meet the above requirements. It may not be able to provide sufficient illumination intensity or may jeopardize the safety of the drivers and pedestrians in the opposite direction.

SUMMARY

In view of the above deficiencies in the prior art, the present disclosure provides a light guiding element, a light guiding device and a lighting module, in order to solve the problem in the prior art that a light type pattern generated by a lamp module may jeopardize safety of drivers and pedestrians.

A first aspect of the present disclosure provides a light guiding element, including: a light guiding element, comprising: a light incident portion and a light exit portion, wherein the light incident portion comprises a plurality of light guiding columns, each of which comprises a first end surface connected to the light exit portion, a second end surface facing away from the light exit portion, and a side surface formed between the first end surface and the second end surface, and the first end surface has an area larger than that of the second end surface.

A second aspect of the present disclosure provides a light guiding device, including: at least one light guiding element according to the first aspect and a retaining element for retaining the light guiding element.

A third aspect of the present disclosure provides a light guiding module, including: a base; a light emitting diode (LED) device disposed on the base; the light guiding device according to the second aspect which is disposed on the LED device; a support element detachably connected to the base for clamping the light guiding device; and a lens device disposed on the support element.

The light guiding element and the light guiding device according to the embodiments of the present disclosure can be used in various types of different lighting modules, such as a low beam light design, a high beam light design, vehicle interior illumination or the like, so that for a light type pattern that is generated, the shape is complete, the color is even, and phenomena of the vignette effect and the dark lines are reduced, thereby reducing potential safety hazards resulting from the above-mentioned problems.

BRIEF DESCRIPTION OF DRAWING(S)

DESCRIPTION OF EMBODIMENTS

Some embodiments of the present disclosure will be described in detail below in combination with the accompanying drawings. The embodiments described below and features thereof can be combined with each other if there is no conflict.

As described in the background, in the related art, there are various problems in a light type pattern generated by a lamp module, including disadvantageous phenomena such as a vignette effect of the light type pattern, color unevenness (yellow halo), dark lines and the like, which may jeopardize safety of drivers and pedestrians. The light guiding element, the light guiding device and the lighting module provided in the present disclosure enable a shape of a generated light type pattern to be complete, color of the generated light type pattern to be even, and the phenomena of vignette effect and dark lines of the generated light type pattern to be reduced, thereby reducing potential safety hazards resulting from the above-mentioned problems. In addition, the present disclosure also provides a light guiding element, a light guiding device and a lighting module applicable to a low beam light, which can provide sufficient illumination intensity without jeopardizing the safety of drivers and pedestrians in the opposite direction.

The light guiding element provided in the present disclosure will be described in detail below.

Figure 1:
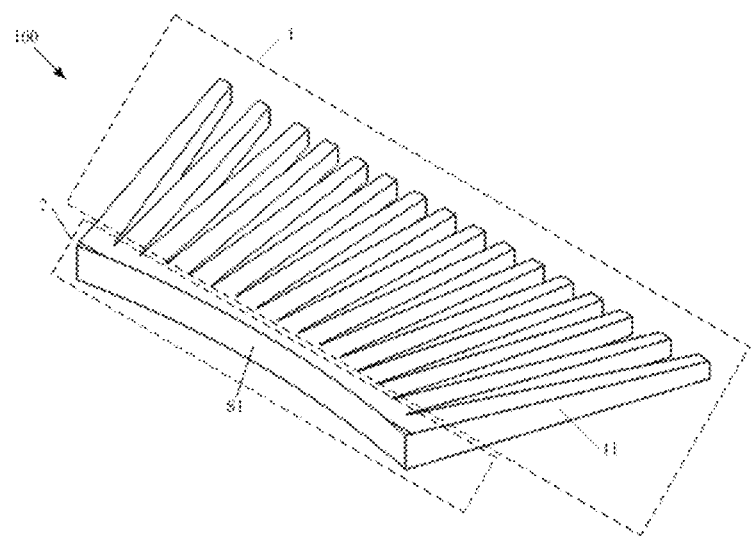
FIG. 1 is a schematic structural view of a light guiding element according to an embodiment of the present disclosure.
Figure 2A:
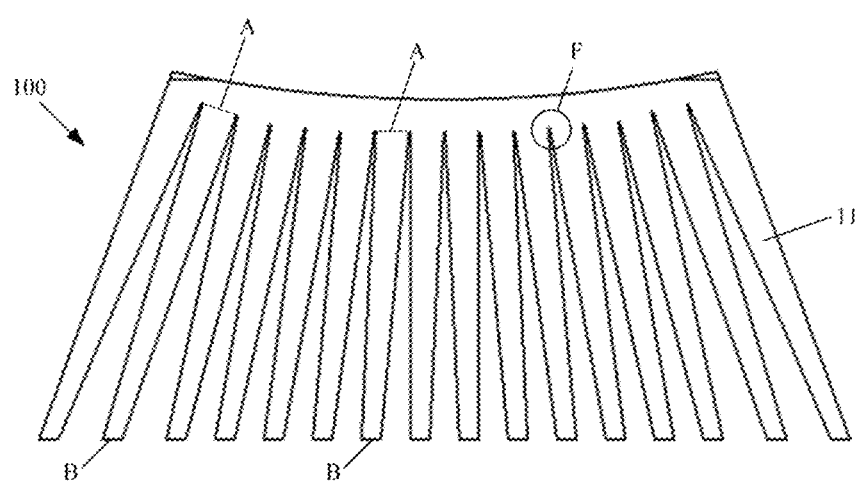
FIG. 2A-FIG. 2F are views of the light guiding element in FIG. 1 from six sides.
Figure 2B:
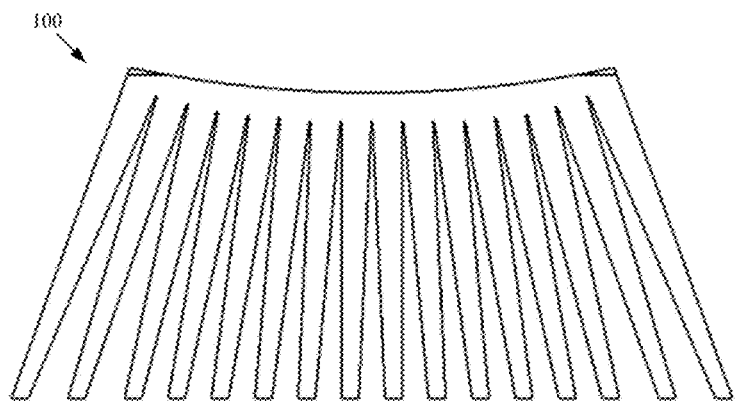
Figure 2C:
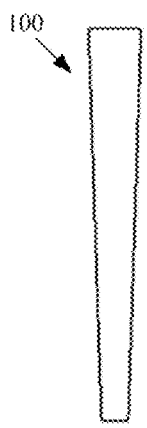
Figure 2D:
Figure 2E:
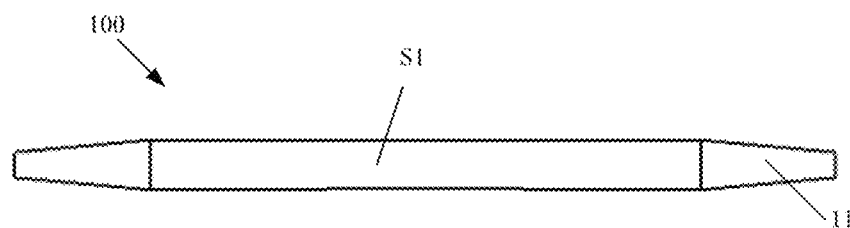
Figure 2F:
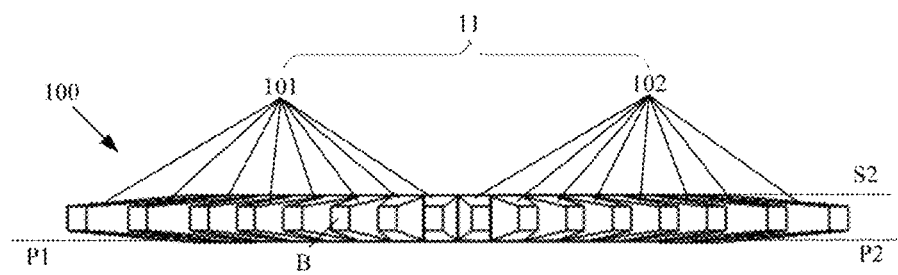

FIG. 1 is a schematic structural view of a light guiding element according to an embodiment of the present disclosure. FIG. 2A-FIG. 2F are views of the light guiding element in FIG. 1 from six sides, where FIG. 2A is a front view of the light guiding element in FIG. 1, FIG. 2B is a rear view of the light guiding element in FIG. 1, FIG. 2C is a left view of the light guiding element in FIG. 1, FIG. 2D is a right view of the light guiding element in FIG. 1, FIG. 2E is a top view of the light guiding element in FIG. 1, and FIG. 2F is a bottom view of the light guiding element in FIG. 1. As shown in FIG. 1 and FIG. 2A-FIG. 2F, the light guiding element 100 may include a light incident portion 1 and a light exit portion 2, where the light incident portion 1 may include a plurality of light guiding columns 11, each of which may include a first end surface A connected to the light exit portion 2, a second end surface B facing away from the light exit portion 2, and a side surface formed between the first end surface A and the second end surface B, where the first end surface A may have an area larger than that of the second end surface B. It will be appreciated that dashed lines in FIG. 1 are used to schematically distinguish the light incident portion 1 and the light exit portion 2.

The light guiding element according to the embodiment of the present disclosure can be applied to a vehicle lighting module, such as a vehicle high beam light, a vehicle low beam light, etc., but the present disclosure is not limited thereto. The lighting module to which the light guiding element according to the embodiment of the present disclosure is applied can generate a light type pattern in compliance with international specification for cut-off line.

As an implementation, each of the light guiding columns 11 may correspond to one of LED elements disposed on an LED device. Light emitted from the LED elements is incident on the light guiding element 100 via the respective light guiding columns 11 of the light incident portion 1, then are emitted from the light guiding element 100 via the light exit portion 2 under total reflection of the respective light guiding columns 11, and then passes through a lens module to emit from the vehicle, so that a light type pattern of a lamp may be generated. In the embodiment of the present disclosure, the second end surfaces B of all the light guiding columns 11 may be aligned with each other, as shown in FIG. 2A, which thus may flatly correspond to light exit surfaces of the LED elements disposed on the LED device and are closely connected thereto (with or without contact) to avoid light leakage.

In the embodiment of the present disclosure, in order to provide a desired total reflection characteristic, the light guiding element 100 may have a refractive index of about 1.3 to about 1.6, and the light guiding element 100 may be made of a resin composition such as silica gel. The light guiding column 11 may have a shape of an scalene cylinder (for example, a cylinder whose one end is wider than the other end), but is not limited to an scalene cylinder with a square cross section (also known as a square scalene cylinder), an scalene cylinder with a circular cross section (also known as a circular scalene cylinders) or other scalene cylinder with any irregular cross section (also known as an irregular scalene cylinder), as long as appropriate total reflection can be provided. In some embodiments of the present disclosure, an scalene cylinder with a substantially square cross section is used as an example of the light guiding column 11, as shown in FIG. 1 and FIG. 2A-FIG. 2F, where a longitudinal section of the light guiding column 11 is substantially trapezoidal, and in some embodiments, the longitudinal section of the light guiding column 11 may be an isosceles trapezoid.

The light guiding columns 11 may have substantially the same shape and are connected to the light exit portion 2 via their first end surfaces A, respectively. In the case where the light guiding columns are scalene cylinders as described above, the first end surface A of each of the light guiding columns 11 has an area larger than that of the second end surface B of each of the light guiding columns 11. A ratio of the area of the first end surface A to the area of the second end surface B of the light guiding column 11 may affect brightness of light. In an implementation of the present disclosure, the area of the first end surface A may be set to be 3 times or 4 times the area of the second end surface B.

The light exit portion 2 has a light exit surface S1 on a side facing away from the light incident portion 1. The light exit surface S1 may be a curved surface. In some embodiments, the light exit surface S1 may be a concave surface, as shown in FIG. 1. The curved surface may have a radius of curvature ranging from about 80 mm to about 120 mm. The first end surface A of the light guiding column 11 may be connected to a surface of the light exit portion 2 opposite to the light exit surface S1, as shown in FIG. 1.

Figure 3A:
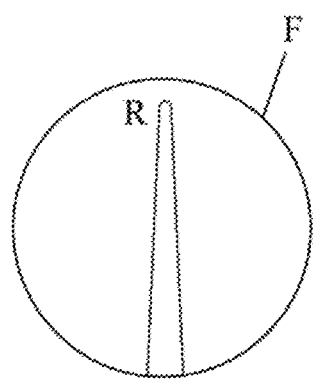
FIG. 3A-FIG. 3C are partial views of the light guiding element in FIG. 1.
Figure 3B:
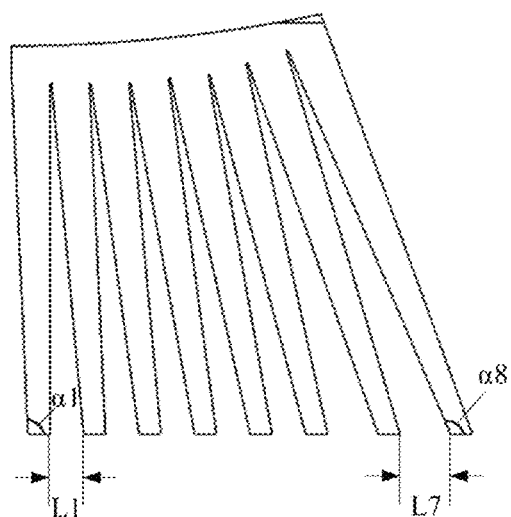
Figure 3C:
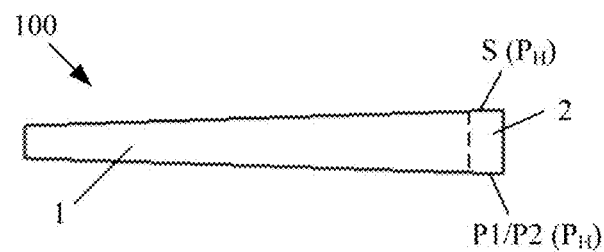

FIG. 3A-FIG. 3C are partial views of the light guiding element in FIG. 1, where FIG. 3A is a partial view of the portion F in FIG. 2A. As shown in FIG. 3A, there is a rounded corner R between two adjacent light guiding columns 11, the size of the rounded corner may affect the width of the dark line of the generated light type pattern. In order to reduce the width of the dark line in the generated light type pattern, the radius of the rounder corner is preferably as small as possible. In some embodiments of the present disclosure, the radius of the rounder corner R may be set to be less than or equal to 0.05 mm.

Figure 4:
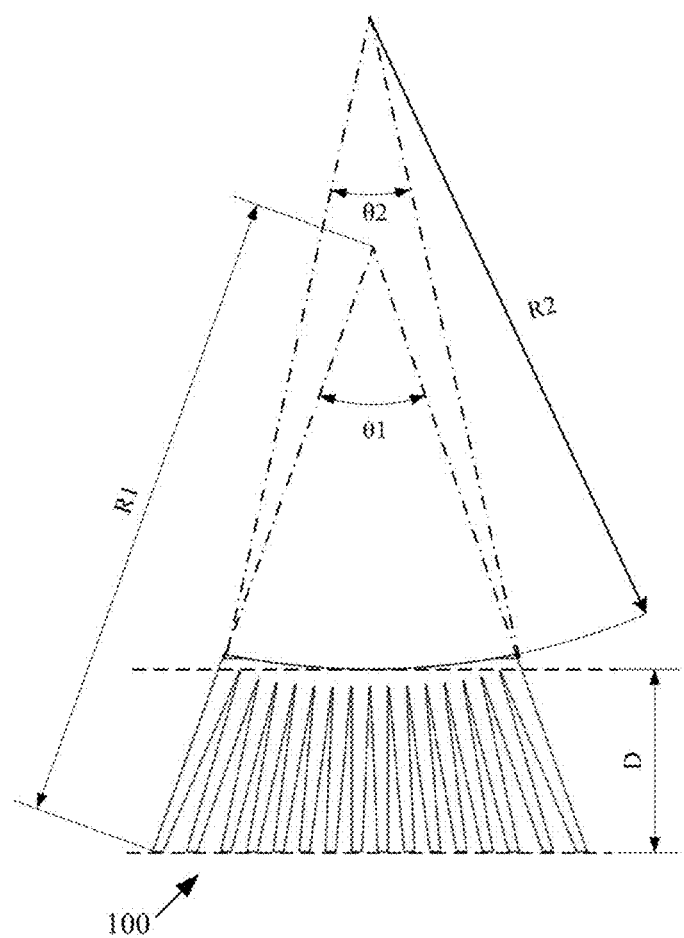
FIG. 4 is a schematic view of a light guiding element according to an embodiment of the present disclosure.

In the embodiment of the present disclosure, the light guiding columns 11 may be radially distributed (also known as sectorially distributed) with respect to the light exit portion 2, and the degree at which the light guiding columns 11 are radial distributed and the degree at which the light exit surface S1 of the light guiding element is curved (i.e. the radius of curvature) may affect evenness of light, thus it is necessary to control them within a certain range. FIG. 4 is a schematic view of a light guiding element according to an embodiment of the present disclosure. As shown in FIG. 4, the radial distribution of the light guiding columns 11 may have a radial angle θ1 of about 30° to about 50°, in particular, it may be, for example, 49.77° for the light guiding element 100 in FIG. 1, and the radial distribution may have an radius of an opening angle R1 about 75 mm to about 85 mm. The light exit surface S1 may have a bending angle θ2 of about 20° to about 35°, in particular, it may be, for example, 30.43° for the light guiding element 100 in FIG. 1, and a radius of curvature R2 may be about 80 mm to about 120 mm, in particular, it may be, for example, 90.71 mm for the light guiding element 100 in FIG. 1. Further, minimum distance D between the light exit surface S1 and the light incident surface may be about 15 mm to about 35 mm.

In order to achieve an effect of uniform light dispersion, the number of light guiding columns 11 may be even, but the present disclosure is not limited thereto. Since the light guiding columns 11 may be radially distributed, there may be spacing L between end portions of second end surfaces B of two adjacent light guiding columns, as shown in FIG. 3B. In some embodiments, the spacing L between all adjacent light guiding columns may be the same except for two light guiding columns that are closest to the center. For the two light guiding columns that are closest to the center, there may be larger spacing L. In other embodiments, the spacing L may be different for different pairs of adjacent light guiding columns. In some embodiments, the spacing L between the two light guiding columns that are closest to the center may be smaller than the spacing L of two pairs of adjacent light guiding columns at the outermost. FIG. 3B shows a right half of the front view of the light guiding element 100 in FIG. 1. As shown in FIG. 3B, the right half of the light guiding element 100 has a total of 8 light guiding columns 11, spacing L7 between adjacent light guiding columns at the outermost is larger than spacing L1 between adjacent light guiding columns that are closest to the center.

In the embodiment of the present disclosure, there is an angle α between the second end surface B of the light guiding column 11 and an inner side surface thereof (i.e. a side surface that is close to and facing toward the center of the light guiding element). Since the light guiding element 100 is radially distributed, the light guiding column 11 at the outermost may have an angle α greater than that of the light guiding column 11 closest to the center. In this way, the light guiding column 11 located at the outer side of the light incident portion 1 may be closely connected (with or without contact) to a corresponding LED disposed on the LED device to avoid light leakage. In some embodiments, the angle α may be at least greater than 90°. As shown in FIG. 3B, an angle α8 of the light guiding column 11 at the outermost may be greater than an angle α1 of the light guiding column 11 that is closest to the center. In the present disclosure, due to different requirements for light types, the spacing L between different adjacent light guiding columns in the light guiding element and the angle α of each light guiding column may be linearly increased from the center to both sides, or it may be nonlinearly increased. It will be appreciated that different spacing L and angles α may be provided according to actual needs.

More specifically, in some embodiments, the plurality of light guiding columns 11 may include a plurality of first light guiding columns 101 and a plurality of second light guiding columns 102, a first plane P1 is formed by a bottom surface of a part of the light exit portion 2 that is connected to the first light guiding columns 101, and a second plane P2 is formed by a bottom surface of a part of the light exit portion 2 that is connected to the second light guiding columns 102. The first plane P1 and the second plane P2 may be aligned with each other (i.e. they are the same plane) as shown in FIG. 2F (the rear view). In other words, the light exit portion 2 of the light guiding element 100 may have a uniform thickness. Specifically, as shown in FIG. 1 and FIG. 2A-FIG. 2F, the light guiding element 100 may be symmetrical (left-right symmetrical as shown in FIG. 2A), for example, it may be used for high beam light illumination of a vehicle. In other embodiments, a height difference may be formed between the first plane and the second plane, that is, the light guiding element may also be asymmetrical, as will be described in detail hereinafter.

By using the light guiding element according to the embodiment of the present disclosure, a lighting module to which the light guiding element is applied is enabled to generate a light type pattern with a complete shape, even color, and phenomena of the effect of vignette and dark lines for the light type pattern can be reduced, and thus the potential safety hazards resulting from the above-mentioned problems can be reduced.

Figure 5A:
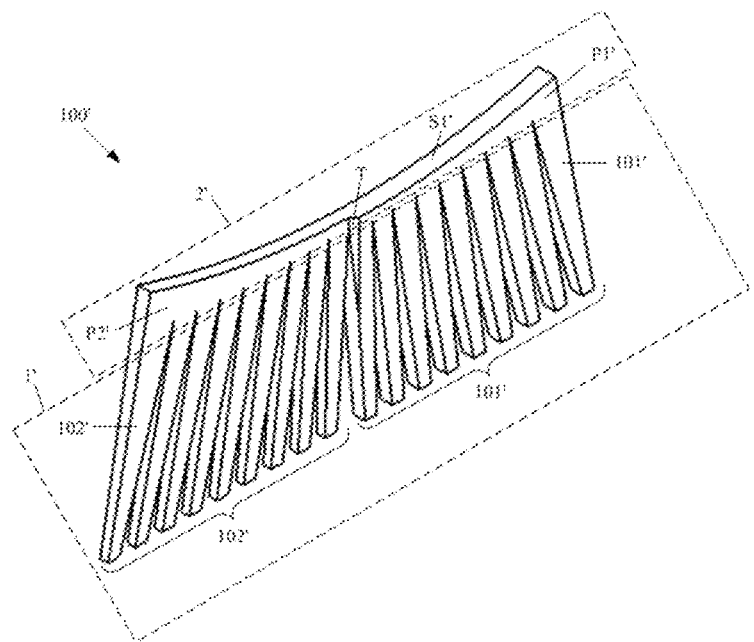
FIG. 5A-FIG. 5C are schematic structural views of another light guiding element according to an embodiment of the present disclosure.
Figure 5B:
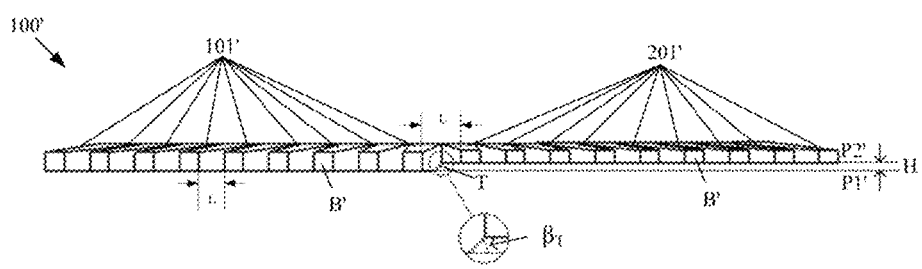
Figure 5C:
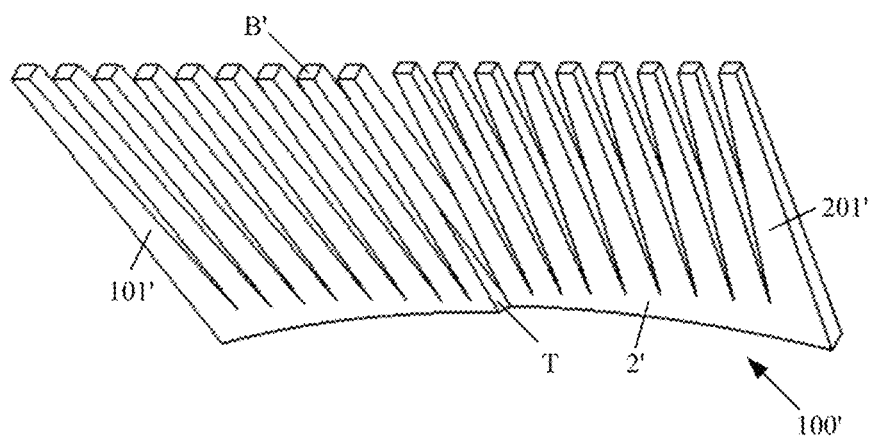

FIG. 5A-FIG. 5C are schematic structural views of another light guiding element according to an embodiment of the present disclosure. FIG. 5A-FIG. 5C respectively show different perspectives of a light guiding element 100'. As shown in the drawings, the light guiding element 100' may include: a light incident portion 1' and a light exit portion 2', where the light incident portion 1' may include a plurality of light guiding columns 11', each of which may include a first end surface A' connected to the light exit portion 2', a second end surface B' facing away from the light exit portion 2', and a side surface formed between the first end surface A' and the second end surface B', where the first end surface A' may have an area larger than that of the second end surface B'. The plurality of light guiding columns 11' may include a plurality of first light guiding columns 101' and a plurality of second light guiding columns 102'. A first plane P1' is formed by a bottom surface of a part of the light exit portion 2' that is connected to the first light guiding columns 101', and a second plane P2' is formed by a bottom surface of a part of the light exit portion 2' that is connected to the second light guiding columns 102'. A height difference H may be formed between the first plane P1' and the second plane P2', and a transition slope T is formed on the light exit portion 2', where the transition slope T connects the first plane P1' to the second plane P2', and a preset angle $\beta_T$ is formed between the transition slope T and the first plane P1' or the second plane P2'.

Figure 6:
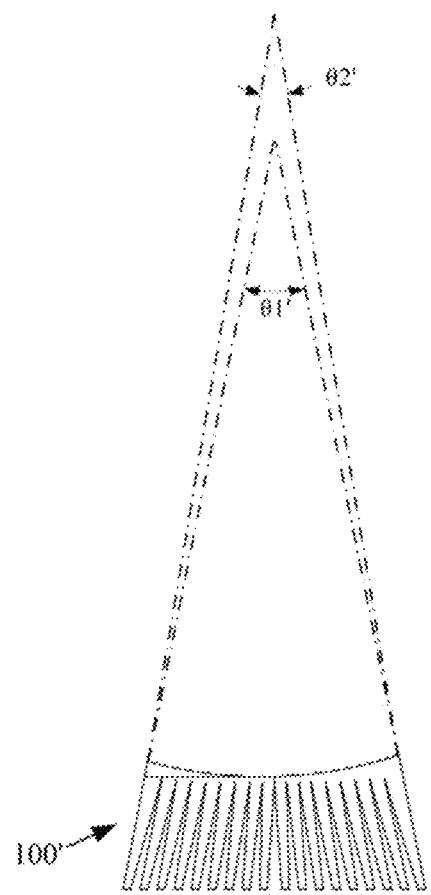
FIG. 6 is a schematic view of another light guiding element according to an embodiment of the present disclosure.

In the embodiment of the present disclosure, the light guiding columns 11' may be radially distributed with respect to the light exit portion 2'. FIG. 6 is a schematic view of another light guiding element according to an embodiment of the present disclosure. As shown in FIG. 6, the radial distribution of the light guiding columns 11' may have a radial angle θ1' of about 30° to about 50°, in particular, it may be, for example, 32.99° for the light guiding element 100' in FIG. 5A-FIG. 5C, and the light exit surface S1' may have a bending angle θ2' of about 20° to about 35°, in particular, it may be, for example, 22.09° for the light guiding element 100' in FIG. 5A-FIG. 5C. In some embodiments, there may be larger spacing L between two light guiding columns closest to the center, that is, a first light guiding column 101' and a second light guiding column 102' which are adjacent to each other, to adapt to the transition slope T, which will be described in detail hereinafter.

Regarding other arrangements such as the material and shape (e.g., a radial distribution, etc.) of the light guiding element 100' as well as the shape, spacing, and angle of the light guiding column 11' therein, reference may be made to the description about the light guiding element 100, for which details will not be described herein again. The light guiding element 100' will be described in detail below in terms of its asymmetry.

In some embodiments of the present disclosure, the light guiding element 100' may be asymmetrical and may be used to generate a light type pattern having an off-axis effect. The number of light guiding columns 11' in the light guiding element 100' may be even, and the first light guiding columns 101' and the second light guiding columns 102' respectively contribute to half of the number. As shown in FIG. 5B, all the first light guiding columns 101' may have the same area for their second end surfaces B', and all the second light guiding columns 102' may have the same area for their second end surfaces B', but the area of the second end surface B' of the first light guiding column 101' is larger than the area of the second end surface B' of the second light guiding column 102'. In an implementation, the bottom surface of the light exit portion 2' connected to the first light guiding columns 101' together with the bottom surfaces of all the first light guiding columns 101' forms the first plane P1', and the bottom surface of the light exit portion 2' connected to the second light guiding columns 102' together with the bottom surfaces of all the second light guiding columns 102' forms the second plane P2', as shown in FIG. 5B. The height difference H may be formed between the first plane P1' and the second plane P2'. Therefore, a portion of the light exit portion 2' connected to the first light guiding columns 101' is thicker than a portion of the light exit portion 2' connected to the second light guiding columns 102'.

The transition slope T is formed on the light exit portion 2', and the transition slope T is located between the portion of the light exit portion 2' connected to the first light guiding columns 101' and the portion of the light exit portion 2' connected to the second light guiding columns 102', and it is used for connecting the two portions, or in other words, used for connecting the first plane P1' and the second plane P2'. The preset angle $\beta_T$ is formed between the transition slope T and the first plane P1' or the second plane P2'. In order to comply with international specifications, the preset angle $\beta_T$ may be 15° or 45°. In some embodiments of the present disclosure, the preset angle $\beta_T$ may be set to 45° according to an actual application, as shown in FIG. 5B. In an implementation, the transition slop T may extend to a first light guiding column 101' adjacent to a second light guiding column 102', as shown in FIG. 5A and FIG. 5C. It will be appreciated that, in this case, at least a part of an inner side surface of that first light guiding column 101' or at least a part of the shape of that first light guiding column 101' may be different from other first light guiding columns 101' to adapt to the transition slope T, as shown in FIG. 5C. Alternatively, in order to adapt to the transition slope T, the transition slope T may also extend to a second light guiding column 102' adjacent to a first light guiding column 101'. In an implementation, the transition slope T may have a triangular shape, as shown in FIG. 5C. It will be appreciated that the transition slope is not limited to the triangular shape, and other suitable shapes may be also used as long as the above-mentioned preset angle can be provided. In some embodiments, the transition slope T may not extend to an end portion of the second end surface B' on the first or second light guiding column, as shown in FIG. 5C.

Therefore, from a perspective facing toward the second end surfaces B' of the light guiding columns 11' (as shown in FIG. 5B), the light guiding element 100' may be asymmetrical due to the above configuration, for example, it may be used for low beam light illumination of a vehicle, and thus a light type pattern that conforms to international specifications can be generated.

It will be appreciated that the bottom surfaces of the first light guiding columns 101' may not be located on the same plane as the first plane P1', and the bottom surfaces of the second light guiding columns 102' may not be located on the same plane as the second plane P2'. As long as the height difference H exists between the first plane P1' and the second plane P2' of the light exit portion 2', an asymmetrical light type pattern can be achieved.

By using the light guiding element according to the embodiment of the present disclosure, a lighting module to which the light guiding element is applied is enabled to generate a light type pattern with a complete shape, even color, and phenomena of the effect of vignette and dark lines for the light type pattern can be reduced. In addition, especially for a low beam light, certain illumination intensity can be maintained without causing interference to drivers and pedestrians in an opposite direction, thereby potential safety hazards resulting from the above-mentioned problems can be further reduced.

The light guiding device provided in the present disclosure will be described in detail below.

Figure 7:
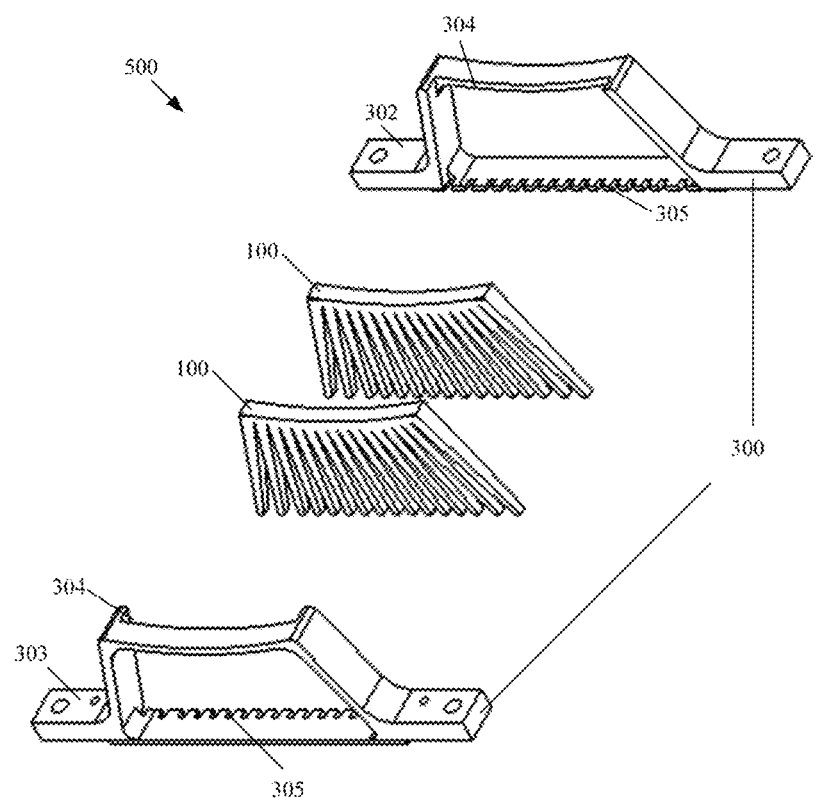
FIG. 7 is a schematic structural view of a light guiding device according to an embodiment of the present disclosure.

FIG. 7 is a schematic structural view of a light guiding device according to an embodiment of the present disclosure. The light guiding device 500 may include at least one light guiding element 100/100' according to any one of the above embodiments and a retaining element 300 for retaining that light guiding element. FIG. 7 shows an example in which two light guiding elements 100 are included, but the number of the light guiding elements in the light guiding device 500 is not limited in the present disclosure. There may be one or more light guiding elements. In the case where the light guiding device 500 includes a plurality of light guiding elements, the plurality of light guiding elements may be disposed in a stacked manner, for example, stacked in a vertical direction, and a bottom surface of a light exit portion of a light guiding element placed at an upper position of two adjacent light guiding elements is connected to a top surface of a light exit portion of a light guiding element placed at a lower position of the two adjacent light guiding elements. Moreover, each of the plurality of light guiding elements may be, for example, the light guiding element 100 shown in FIG. 1 (shown in FIG. 7), or the plurality of light guiding elements may be a combination of the light guiding element 100 shown in FIG. 1 and the light guiding element 100' shown in FIG. 5A, and different light guiding elements in a same light guiding device 500 may have different curvatures for the light exit surfaces and different numbers of the light guiding columns, and a specific combination and arrangement may be changed according to a light type pattern actually required, in addition, the retaining element 300 may also be changed accordingly, which is not limited in the present disclosure. To provide the plurality of light guiding elements may increase light density.

FIG. 8A-FIG. 8D are schematic structural views of a light guiding element in a light guiding device according to an embodiment of the present disclosure. As shown in FIG. 8A-FIG. 8D, the light guiding device may include one first light guiding element 100' as shown in FIG. 5A and one second light guiding element 100 as shown in FIG. 1, and the present embodiment is applicable to, for example, low beam illumination of a vehicle. The first light guiding element 100' may be asymmetrical and disposed at a lower position, and the second light guiding element 100 may be symmetrical and disposed at an upper position. The first light guiding element 100' and the second light guiding element 100 may be stacked in a vertical direction, and a bottom surface of the light exit portion 2 of the second light guiding element 100 is connected to a top surface of the light exit portion 2' of the first light guiding element 100'. In order to ensure a degree of horizontal alignment of the plurality of light guiding elements, a horizontal platform $P_H$ may be disposed on light exit portions of the light guiding elements, so that horizontality of the plurality of light guiding elements can be ensured when they are stacked. As shown in FIG. 3C, the top surface S2 and the bottom surface P1/P2 of the light exit portion 2 of the light guiding element 100 may be provided as a horizontal plane (i.e. the horizontal platform $P_H$). It should be noted that the dashed lines in FIG. 3C are used to schematically distinguish the light incident portion 1 and the light exit portion 2, for the shapes and structures of the light incident portion 1 and the light exit portion 2, reference may be made to FIG. 1. It will be appreciated that, the asymmetrical light guiding element 100' is generally disposed at the lowermost of the light guiding device 500, so that only its top surface S2' may be provided as a horizontal plane.

Since a light guiding element of the present disclosure can be made of a soft material, the retaining element 300 may also be used to retain and support the light guiding element. The retaining element 300 may also be used to provide a clamping function to compress the light guiding element from both sides so that the rounded corner R may be fixed or even reduced to achieve the effect of further reducing dark lines.

In the embodiment of the present disclosure, the retaining element 300 may be configured as a structure that is separated from the top and bottom to facilitate combination. As shown in FIG. 7, the retaining element 300 may include an upper retaining mold 302 disposed on an upper side of the light guiding element 100 and a lower retaining mold 303 disposed on a lower side of the light guiding element 100. Each of the upper retaining mold 302 and the lower retaining mold 303 may have a primary groove 304 and a plurality of secondary grooves 305. The primary groove 304 may be used for accommodating the light exit portion 2 of the light guiding element 100 and may have a curved surface with a curvature corresponding to that of the light exit surface S1 of the light exit portion 2 of the light guiding element 100. The primary groove 304 may be equal to or slightly smaller than the light exit portion 2 in terms of size to provide an appropriate compression ratio. The plurality of secondary grooves 305 may be used for accommodating end portions where the second end surfaces B of the plurality of light guiding columns 11 of the light guiding element 100 are located and maintaining spacing L therebetween. The number of the secondary grooves 305 may be equal to or greater than the number of light guiding columns to be accommodated in the secondary grooves 305.

In an implementation, the retaining element 300 may have a hollow structure, so that the respective light guiding columns can be exposed from the hollow structure to improve a heat dissipation effect and save materials. In another implementation, the retaining element 300 may have a solid structure, which is not limited in the present disclosure, as long as the retaining element 300 has a space for accommodating the light guiding element.

Figure 9:
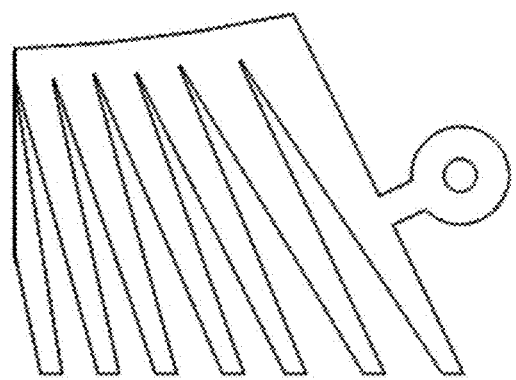
FIG. 9 is a partial schematic view of a light guiding element in another light guiding device according to an embodiment of the present disclosure.

In some embodiments, a retaining structure may be provided on both sides of the light guiding element 100/100' to increase the degree of bonding of the retaining element 300 to the light guiding element 100/100'. FIG. 9 is a partial schematic view of a light guiding device in another light guiding device according to an embodiment of the present disclosure. In an implementation, as shown in FIG. 9, ear portions having keyholes may be provided on both sides of the light guiding element, where the ear portions are connected to the light guiding columns at the outermost. Correspondingly, the retaining element 300 may be provided with a recess portion engaged with the ear portion, and each recess portion has a corresponding hole so that a screw, for example, is used to penetrate through a keyhole structure composed of the recess portion and the hole of the retaining element 300 and the ear portion of the light guiding element 100/100' to achieve a locking effect.

In some embodiments, a mechanical structure for attachment to other elements/devices may be provided on the retaining element 300. As shown in FIG. 7, the upper retaining mold 302 and the lower retaining mold 303 may respectively have two keyholes for engagement with external elements/devices.

By using the light guiding element according to the embodiment of the present disclosure, a lighting module to which the light guiding element is applied is enabled to generate a light type pattern with a complete shape, even color, and phenomena of the effect of vignette and dark lines can be reduced. In addition, especially for a low beam light, certain illumination intensity can be maintained without causing interference to drivers and pedestrians in an opposite direction, thereby potential safety hazards resulting from the above-mentioned problems can be further reduced.

The lighting module provided in the present disclosure will be described in detail below.

Figure 10:
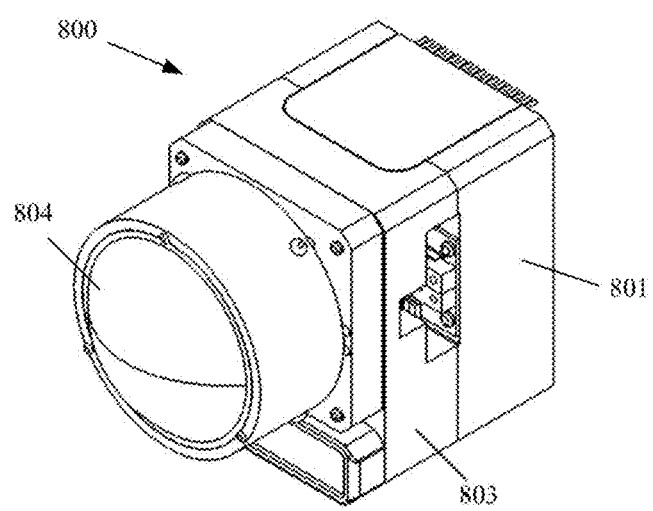
FIG. 10 is a schematic structural view of a lighting module according to an embodiment of the present disclosure.
Figure 11:
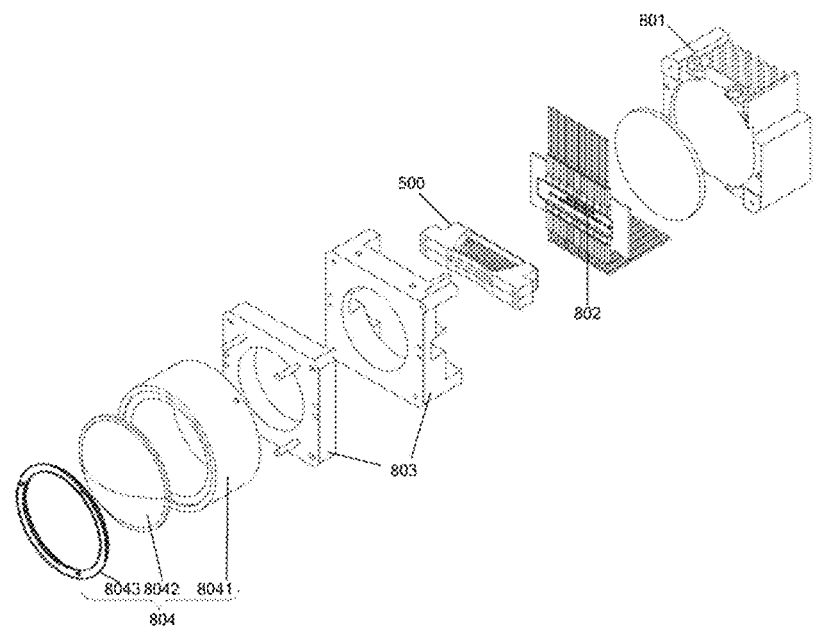
FIG. 11 is an exploded view of a lighting module according to an embodiment of the present disclosure.
Figure 12:
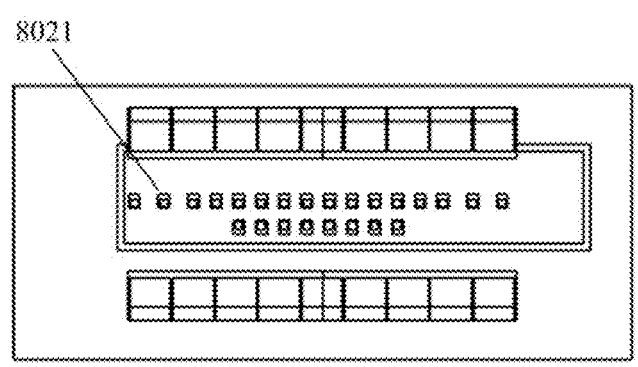
FIG. 12 is a schematic structural view of the LED device in FIG. 11.

FIG. 10 is a schematic structural view of a lighting module according to an embodiment of the present disclosure; FIG. 11 is an exploded view of a lighting module according to an embodiment of the present disclosure; and FIG. 12 is a schematic structural view of an LED device in FIG. 11. As shown in FIG. 10-FIG. 12, the lighting module 800 may include a base 801, an LED device 802 disposed on the base 801, the light guiding device 500 according to any one of embodiments which is disposed on the LED device 802, a support element 803 detachably connected to the base 801 for clamping the light guiding device 500, and a lens device 804 disposed on the support element 803. In some embodiments, the base 801 may be provided with a radiator.

The LED device 802 may include a plurality of LED elements 8021 arranged in a matrix manner. In some embodiments, as shown in FIG. 12, the LED device 802 may include an upper row and a lower row of LED elements, where there may be more LED elements in the upper row than in the lower row, and cable connectors may be arranged on upper and lower sides of the LED elements. As mentioned above, each LED element may correspond to one light guiding column 11/11'. In some embodiments, the second end surfaces B/B' of all of the light guiding columns 11/11' may be aligned with each other and in the same plane, and each of the second end surfaces B/B' corresponds to a light exit surface of a corresponding LED element. Thus, the light emitted from the LED device 802 may be transmitted to the lens device 804 via the light guiding device 500, and then depart from the vehicle after passing through the lens device 804, so that a light type pattern of a lamp may be generated. In an implementation, each of the LED elements may be independently controlled by a control circuit to generate a corresponding lighting area. Under the control of the control circuit, the lighting area of each LED element may be controlled to be lightened or not to be lighted, and thus a desired light type pattern can be generated and intelligent control is achieved. It should be noted that the second end surfaces B/B' of the light guiding columns 11/11' may or may not be in contact with the light exit surfaces of the respective LED elements. In the case where the second end surface of the light guiding element is not in contact with the light exit surface of the corresponding LED element, spacing between them may be set to be less than 0.5 cm, so that most of the light from the LED element can enter the light guiding column.

The lens device 804 may include a lens holder 8041 and a lens element 8042. The lens element may have a focus located at the light exit surface of the light guiding element 100/100'. The lens device 804 may also include a detachable lens retaining element 8043 for detaching, replacing or locking the lens element 8042, so that the lens element 8042 in the lens device 804 may be arbitrarily detached and replaced. The retaining element 8043 may be, for example, a retaining ring. The lens device 804 may include a hollow structure that corresponds to the hollow structure of the support element 803. These hollow structures may be used to accommodate the light guiding device 500 and ensure light path clearance where no medium exists. The support element 803 may have a plurality of support columns, and the lens device 804 may have a plurality of narrow paths for accommodating these support columns. In some embodiments, each of the support element 803 and the lens device 804 has a height adjustment structure for adjusting the height of the lens element 8042 such that the focus of the lens element 8042 is located at the light exit surface of the light guiding element 100/100'.

Figure 13A:
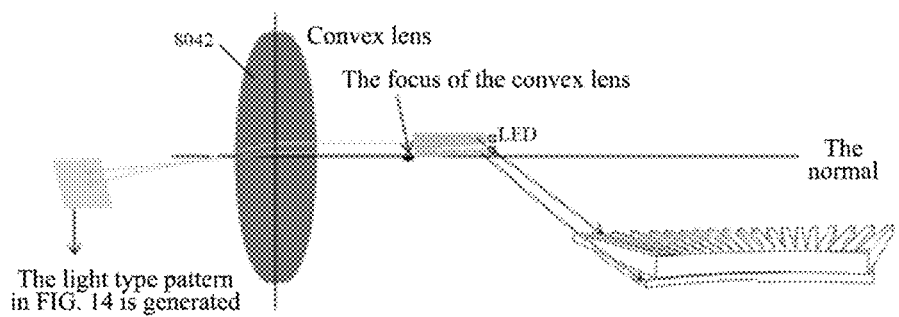
FIG. 13A-FIG. 13C are schematic views showing arrangement of a lens element and a light guiding element in a lighting module according to an embodiment of the present disclosure.
Figure 13B:
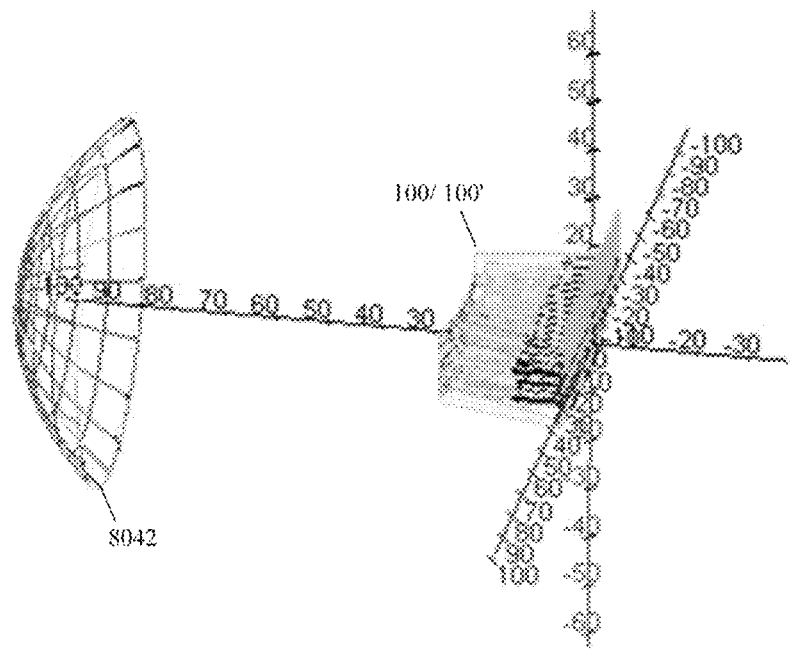
Figure 13C:
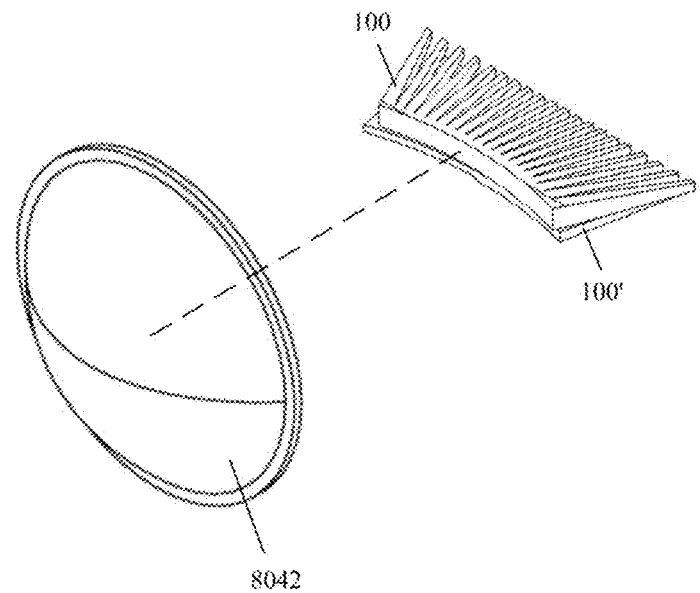
Figure 14:
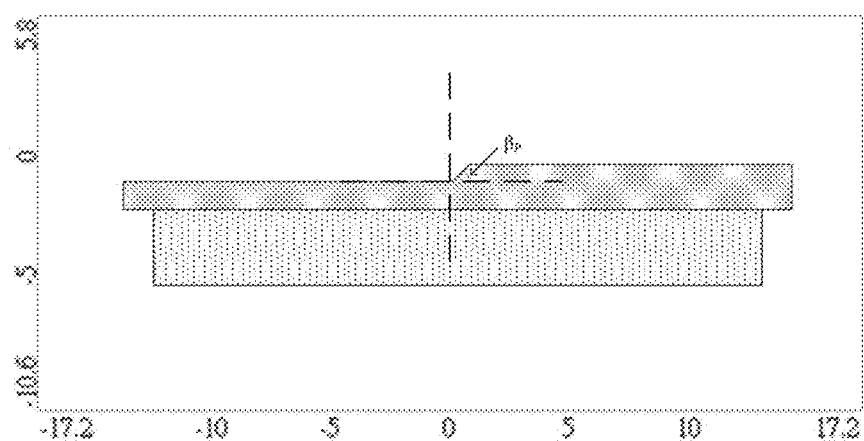
FIG. 14 is a schematic view showing a light type pattern generated by a lighting module according to an embodiment of the present disclosure.

FIG. 13A-FIG. 13C are schematic views of arrangement of a lens element and a light guiding element in a lighting module according to an embodiment of the present disclosure; FIG. 14 is a schematic view of a light type pattern generated by a lighting module according to an embodiment of the present disclosure, which shows a light type pattern seen from the perspective of a driving position on the left, where the abscissa (horizontal coordinates) and the ordinate (vertical coordinates) are both measured in degrees, and the center coordinate may be a geometric center of the lighting module (e.g., a low beam light), but the present disclosure is not limited thereto.

Figure 8A:
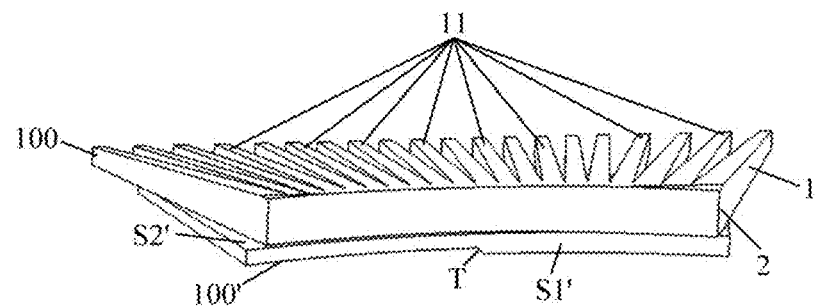
FIG. 8A-FIG. 8D are schematic structural views of a light guiding element in a light guiding device according to an embodiment of the present disclosure.
Figure 8B:
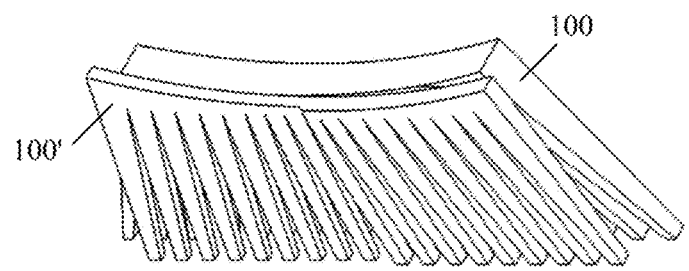
Figure 8C:
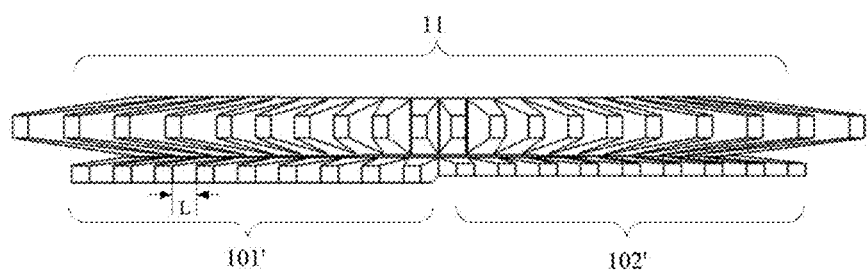
Figure 8D:
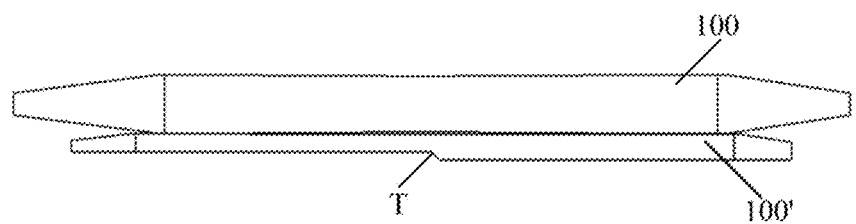

In a specific implementation, the light guiding elements are as shown in FIG. 8A-FIG. 8C, where the asymmetrical first light guiding element 100' is provided with 9 first light guiding columns 101' and 9 second light guiding columns 102'. The bottom surfaces of all the first light guiding columns 101' together with the bottom surface of the light exit portion 2' connected to the first light guiding columns 101' form a first plane P1', and the bottom surfaces of all the second light guiding columns 102' together with the bottom surface of the light exit portion 2' connected to the second light guiding columns 102' form a second plane P2'. The area of the second end surfaces B' of the first light guiding columns 101' is larger than the area of the second end surfaces B' of the second light guiding columns 102'. In the symmetrical second light guiding element 100, 20 light guiding columns 11 are symmetrically disposed. Reference may be made to FIG. 8C and FIG. 8D, where specific sizes of the first and second light guiding elements may be as follows: a length of the second end surface B' of the first light guiding column 101' of the first light guiding element 100' in the vertical direction is 1.5 mm, a length of the second end surface B' of the first light guiding column 101' of the first light guiding element 100' in the horizontal direction is 1.5 mm, a length of the second end surface B' of the second light guiding column 102' in the vertical direction is 1 mm, a length of the second end surface B' of the second light guiding column 102' in the horizontal direction is 1.5 mm, spacing L between adjacent light guiding columns that are closest to the center is 3 mm, other spacing L is 2 mm, the light exit portion 2' of the first light guiding element 100' has a maximum thickness of 2.2 mm, the light exit surface S1' has a horizontal width of 51.5 mm, and the light incident portion 1' has a maximum horizontal width of 62 mm; a length of the second end surface B of the light guiding column 11 of the second light guiding element 100 in the vertical direction is 1.9 mm and a length of the second end surface B of the light guiding column 11 of the second light guiding element 100 in the horizontal direction is 1.3 mm, for 10 light guiding columns 11 (with 5 on each of the left and right sides) at the outermost, spacing L of 3 mm is formed therebetween, other spacing L is 2 mm, the light exit portion 2 of the second light guiding element 100 has a thickness of 5 mm, the light exit surface S1 has a horizontal width of 47.6 mm, and the light incident portion 1 has a maximum horizontal width of 72 mm; a total thickness of the two light guiding elements is 6.64 mm, where vertical distance from an upper edge of the second end surface B of the light guiding column 11 of the second light guiding element 100 to a lower edge of the second end surface B' of the second light guiding column 102' of the first light guiding element 100' is 5.09 mm. The LED device 802 is as shown in FIG. 12, which may include an upper row and a lower row of LED elements, where there may be more LED elements on the upper row than on the lower row, and each of the LED elements may correspond to one light guiding column 11/11'. As shown in FIG. 13A, the light guiding device 500 may be disposed above the normal line of the lens element 8042, and the light exit surface of the light guiding element is located near the focus of the lens element 8042. It should be noted that, in the case where at least two light guiding elements are stacked, the focus of the lens element may be located on the light exit surface of the light guiding element closest to the normal line of the lens element (i.e. the first one above the normal line). Alternatively, compared with the light exit surface of other light guiding element that is stacked, the focus of the lens element may be closer to the light exit surface of the light guiding element closest to the normal line of the lens element (i.e. the first one above the normal line).

As shown in FIG. 14, due to asymmetry of the first light guiding element 100' in the lighting module, a light type pattern generated by the lighting module is also asymmetrical. For the purpose of illustration, two dashed lines are shown in the drawing, which divide the light type pattern into four regions. The horizontal dashed line may also be referred to as a cut-off line, which is −0.57° on the vertical axis. It will be appreciated that, due to characteristics of the lens element, when the first plane and the second plane having a height difference therebetween are located at the bottom of the light guiding element as shown in FIG. 13A, an asymmetrical part of the generated light type pattern will be located on top of the light type pattern after a vertical flip caused by the lens element (for example, 180°), as shown in FIG. 14. Specifically, there is no light in the upper left region (i.e. the region above the cut-off line) of the light type pattern, so that there will be no interference to drivers and pedestrians in an opposite direction, while there is a certain degree of light in the upper right region, so that a certain illumination intensity can be maintained on the road ahead. As can be seen from the drawing, corresponding to the preset angle $\beta_T$ between the transition slope T and the first plane P1' or the second plane P2' in the first light guiding element 100', an angle $\beta_P$ is also formed in the generated light type pattern. The angle $\beta_P$ is formed on the left side of the upper right region of the light type pattern, and is formed between the left edge of the light type pattern in the upper right region and the horizontal dashed line. Due to the characteristics of the light and its propagation, the angle $\beta_P$ is not exactly 15° or 45°. It can also be seen from FIG. 14 that since the total thickness of the first light guiding element 100' is smaller than the total thickness of the second light guiding element 100 (as shown in FIG. 8D), the upper part of the light type pattern (the part indicated by the intensive dots as shown in FIG. 14) is brighter than the lower part (the part indicated by the sparse dots as shown in FIG. 14).

Table 1 shows test results of the light type patterns generated according to the above specific implementations. The first column in Table 1 represents a name of a test location for testing illumination intensity, the second column represents a value of a corresponding test location, the third and fourth columns respectively represent the maximum and minimum values for each test location according to international specifications, and the fifth column represents a specific test location. It can be seen from Table 1 that illumination intensity at each test location in the light type pattern generated by the lighting module according to the embodiment of the present disclosure complies with requirements of international specifications.

TABLE 1

| Specification ECE low beam R112 B-type low beam ES 13.2 V | | | | | |
|---|---|---|---|---|---|
| Name | Test value (cd) | Minimum value (cd) | Maximum value (cd) | Test location/region H, H/V, V (degree) | Discovery location (degree) |
| B 50 L | 346.2 | — | 350.0 | −3.4, 0.6 | |
| BR | 171.2 | — | 1750.0 | 2.5, 1.0 | |
| 75R | 10811 | 10100 | — | 1.1, −0.6 | |
| 75L | 611.9 | — | 10600 | −3.4, −0.6 | |
| 50L | 3341.1 | — | 13200 | −3.4, −0.9 | |
| 50R | 21563 | 10100 | — | 1.7, −0.9 | |
| 50V | 7458.3 | 5100.0 | — | 0.0, −0.9 | |
| 25L | 23811 | 1700.0 | — | −9.0, −1.7 | |
| 25R | 20222 | 1700.0 | — | 9.0, −1.7 | |
| HV | 407.5 | — | 625.0 | 0.0, 0.0 | |
| Z III | 462.0 | — | 625.0 | −4.9, 0.3 | |
| Z IV | 3116.5 | 2500.0 | — | −5.2, −5.7; 5.2, −0.9 | −2.1, −0.9 |
| Z1 < 2*I50R | 29372 | — | 42960 | −9.0, −4.0. 9.0, −1.7 | −1.8, −1.7 |
| P1 + P2 + P3 | 302.4 | 190.0 | — | −8.0, 4.0; 0.0, 4.0; 8.0, 4.0 | |
| P4 + P5 + P6 | 506.8 | 375.0 | — | −4.0, 2.0; 0.0, 2.0; 4.0, 2.0 | |
| P7 | 442.2 | 65.00 | — | −8.0, 0.0 | |
| P8 | 417.0 | 125.0 | — | −4.0, 0.0 | |

Figure 15:
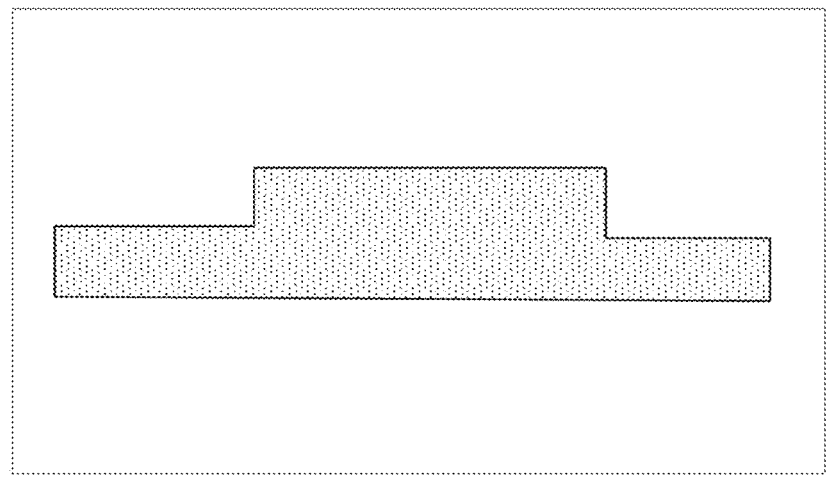
FIG. 15 is a schematic view showing a light type pattern generated by another lighting module according to an embodiment of the present disclosure.

FIG. 15 is a schematic view of a light type pattern generated by another lighting module according to an embodiment of the present disclosure. In this implementation, the light guiding device 500 may be as shown in FIG. 7, which includes two stacked light guiding elements 100 as shown in FIG. 1. The light guiding elements 100 are made of silica gel having a refractive index of 1.41. Each light guiding element 100 includes 16 light guiding columns 11, where each of the light guiding columns 11 has a shape of square scalene cylinder, a ratio of the area of the first end surface A to the area of the second end surface B is 3.8, the rounder corner R is 0.05 mm, the radial distribution of the light guiding columns 11 has a radial angle θ1 of 40°, and a radius of an opening angle R1 of the radial distribution is 80 mm. The light exit surface S1 has a bending angle θ2 of 23° and a radius of curvature $R_2$ of 90 mm. The minimum distance D between the light exit surface S1 and the light incident surface is 23 mm. Moreover, top and bottom surfaces of the light exit portion of the light guiding element 100 are set as horizontal planes (i.e. horizontal platforms). The two light guiding elements 100 are retained using the retaining element 300; meanwhile the retaining element 300 is secured by a screw, so that the light guiding device is formed. The LED device is secured to the base 801 by a screw, the support element 803 is coupled to the base 801 by a screw, and the light guiding device 500 is clamped in the support element 803. The LED device 802 has 24 LED elements which are arranged in two rows with left-right symmetry, where the upper row has 8 LED elements and the lower row has 16 LED elements. The second end surfaces of two rows of the light guiding columns of the two light guiding elements 100 are aligned with each other and in the same plane, which are aligned with the light exit surfaces of the respective LED elements in a not-in-contact manner, with spacing of about 0.05 mm. As shown in FIG. 11, the support element 803 may be provided with separate upper and lower portions, where the upper portion has four support columns which can be engaged with the clamping structure on the lens device to achieve height adjustment. The hollow structures of the support element 803 and the lens device 804 accommodate the light guiding device 500. The lens device 804 is disposed on the support element 803. The lens device 804 includes a lens holder 8041, a lens element 8042, and a detachable retaining ring 8043 for retaining the lens element 8042 to the lens holder 8041 and locking them with a screw. There are four narrow paths on the lens holder 8041, the support columns can be respectively inserted into the four narrow paths for adjusting the focus of the lens element to the light exit surface of the light guiding element and then being fixed by a screw. Under control of a control circuit, the light emitted from each LED element enters the light guiding device first, and then the light enters the lens device and is emitted outside, thereby generating a desired light type pattern. It will be appreciated that, due to characteristics of the lens element, the light type pattern is vertically flipped after being projected by the lens device 804, so that a light type pattern having a lower lighting area wider than an upper lighting area can be formed, and the generated illumination angle may be about 25°. As shown in FIG. 15, the light type pattern generated by applying the lighting module described above has a complete shape, and there is no phenomenon of the effect of vignette, and there is less phenomenon of yellow halo. At the same time, no dark line is generated between adjacent lighting areas.

By using the light guiding element according to the embodiment of the present disclosure, a lighting module to which the light guiding element is applied is enabled to generate a light type pattern with a complete shape, even color, and phenomena of the effect of vignette and dark lines can be reduced. In addition, especially for a low beam light, certain illumination intensity can be maintained without causing interference to drivers and pedestrians in an opposite direction, thereby potential safety hazards resulting from the above-mentioned problems can be further reduced.

The above examples are only embodiments of the present disclosure, and the patent scope of the present disclosure is not limit thereto. Any equivalent structures or equivalent process transformations made in conjunction with contents in the specification and drawings of the present disclosure, or directly or indirectly using the contents in the specification and drawings of the present disclosure to other related technical fields should fall into the protection scope of the present disclosure.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein, and those modifications or replacements do not make the essence of corresponding technical solutions depart from the scope of the technical solutions in the embodiments of the present disclosure.

The invention claimed is:

1. A light guiding device, comprising:
   at least one light guiding element, which includes a light incident portion and a light exit portion, wherein the light incident portion includes a plurality of light guiding columns, each light guiding column including a first end surface connected to the light exit portion, a second end surface facing away from the light exit portion, and a side surface formed between the first end surface and the second end surface, and the first end surface has an area larger than that of the second end surface; and
   a retaining element for retaining the light guiding element, wherein the retaining element comprises an upper retaining mold disposed on an upper side of the light guiding element and a lower retaining mold disposed on a lower side of the light guiding element, wherein
   each of the upper retaining mold and the lower retaining mold has one primary groove and a plurality of secondary grooves, wherein the primary groove is used to accommodate the light exit portion of the light guiding element, and the plurality of secondary grooves are used to accommodate end portions where the second end surfaces of the plurality of light guiding columns of the light guiding element are located, the primary groove has a curved surface, and a curvature of the curved surface of the primary groove corresponds to a curvature of a light exit surface of the light exit portion of the light guiding element; and
   the light guiding element is provided with ear portions on both sides, and the retaining element is provided with recess portions engaged with the ear portions.

2. The light guiding device according to claim 1, wherein the plurality of light guiding columns of the light guiding element comprise a plurality of first light guiding columns and a plurality of second light guiding columns, a first plane is formed by a bottom surface of a part, that is connected to the first light guiding columns, of the light exit portion of the light guiding element, and a second plane is formed by a bottom surface of a part, that is connected to the second light guiding columns, of the light exit portion of the light guiding element.

3. The light guiding device according to claim 2, wherein there are a plurality of the light guiding elements, the plurality of the light guiding elements are disposed in a stacked manner, and a bottom surface of a light exit portion of a light guiding element placed at an upper position of two adjacent light guiding elements is connected to a top surface of a light exit portion of a light guiding element placed at a lower position of the two adjacent light guiding elements.

4. The light guiding device according to claim 3, wherein the first plane and the second plane of each of the light guiding elements are aligned with each other.

5. The light guiding device according to claim 3, wherein the plurality of light guiding elements comprise one first light guiding element and at least one second light guiding element, and the first light guiding element is disposed at the lowermost:
   a height difference is formed between the first plane and the second plane of the first light guiding element, and a transition slope is formed on the light exit portion of the first light guiding element, wherein the transition slope connects the first plane and the second plane, and a preset angle is formed between the transition slope and the first plane or the second plane; and
   the first plane and the second plane of each of the second light guiding elements are aligned with each other.

6. The light guiding device according to claim 2, wherein a height difference is formed between the first plane and the second plane; and
   a transition slope is formed on the light exit portion, wherein the transition slope connects the first plane and the second plane, and a preset angle is formed between the transition slope and the first plane or the second plane, wherein the preset angle is 15 degrees or 45 degrees.

7. The light guiding device according to claim 1, wherein the light exit portion has a light exit surface which is disposed facing away from the plurality of light guiding columns and is a curved surface, wherein the curved surface has a radius of curvature ranging from 80 mm to 120 mm.

8. The light guiding device according to claim 1, wherein the area of the first end surface is 3 times or 4 times that of the second end surface.

9. The light guiding device according to claim 1, wherein the second end surfaces of the plurality of light guiding columns are aligned with each other.

10. The light guiding device according to claim 1, wherein the plurality of light guiding columns are presented as a radial distribution with respect to the light exit portion, wherein the radial distribution has a radial angle of 30 degrees to 50 degrees.

11. The light guiding device according to claim 1, wherein each of the plurality of light guiding columns is a square scalene cylinder, a rounded corner is formed between two adjacent light guiding columns of the plurality of light guiding columns, and the rounded corner has a radius that is less than 0.05 mm, and the plurality of light guiding columns are made of silica gel.

12. A lighting module, comprising:
   a base;
   a light emitting diode LED device disposed on the base;
   a light guiding device, which is disposed on the LED device wherein the light guiding device includes at least one light guiding element and a retaining element for retaining the light guiding element, wherein the light guiding element includes a light incident portion and a light exit portion, wherein the light incident portion includes a plurality of light guiding columns, each of which includes a first end surface connected to the light exit portion, a second end surface facing away from the light exit portion, and a side surface formed between the first end surface and the second end surface, and the first end surface has an area larger than that of the second end surface;
   a support element detachably connected to the base for clamping the light guiding device; and
   a lens device disposed on the support element,
   wherein the support element has a plurality of support columns, and the lens device has a plurality of narrow paths for accommodating the support columns, and each of the support element and the lens device has a height adjustment structure.

13. The lighting module according to claim 12, wherein the support element has a first hollow structure for accommodating the light guiding device, and the lens device has a second hollow structure for accommodating the light guiding device and is configured as corresponding to the first hollow structure.

14. The lighting module according to claim 12, wherein the lens device comprises a lens element which has a focus located on a light exit surface of the light guiding element in the light guiding device, and the lens device further comprises a retaining ring for retaining the lens element.

15. The lighting module according to claim 12, wherein the LED device comprises a plurality of LED elements, each of which is configured as corresponding to one of the light guiding columns of the light guiding element in the light guiding device, and the second end surface of the light guiding column is in contact with a light exit surface of the LED element.

* * * * *